US011172222B2

(12) United States Patent
Alpaslan et al.

(10) Patent No.: US 11,172,222 B2
(45) Date of Patent: Nov. 9, 2021

(54) RANDOM ACCESS IN ENCODED FULL PARALLAX LIGHT FIELD IMAGES

(71) Applicant: Ostendo Technologies, Inc., Carlsbad, CA (US)

(72) Inventors: Zahir Y. Alpaslan, San Marcos, CA (US); Hussein S. El-Ghoroury, Carlsbad, CA (US)

(73) Assignee: Ostendo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/452,008

(22) Filed: Jun. 25, 2019

(65) Prior Publication Data

US 2019/0394488 A1 Dec. 26, 2019

Related U.S. Application Data

(60) Provisional application No. 62/690,001, filed on Jun. 26, 2018.

(51) Int. Cl.
*H04N 19/597* (2014.01)
*H04N 19/80* (2014.01)
(Continued)

(52) U.S. Cl.
CPC ......... *H04N 19/597* (2014.11); *H04N 19/105* (2014.11); *H04N 19/17* (2014.11); *H04N 19/80* (2014.11)

(58) Field of Classification Search
None
See application file for complete search history.

(56) References Cited

U.S. PATENT DOCUMENTS

| 5,613,048 A | 3/1997 | Chen et al. |
| 6,009,188 A | 12/1999 | Cohen et al. |

(Continued)

FOREIGN PATENT DOCUMENTS

| TW | 201904279 A | 1/2019 |
| TW | 202002625 A | 1/2020 |

(Continued)

OTHER PUBLICATIONS

"International Search Report and Written Opinion of the International Searching Authority dated Sep. 24, 2019; International Application No. PCT/US2019/039165", dated Sep. 24, 2019.

(Continued)

*Primary Examiner* — Rebecca A Volentine
(74) *Attorney, Agent, or Firm* — Greg Caldwell, Esq.; W. Eric Boyd, Esq.

(57) ABSTRACT

Methods and systems for light field image encoding and decoding are disclosed. According to some embodiments, the method receives scene metadata and input light field images associated with a scene. The method further performs a first encoding operation on the scene metadata and the input light field images to generate reference views and reference disparity information. The method further performs a second encoding operation based on the reference views, the reference disparity information, and synthesized residuals to output encoded light field data, where the encoded light field data comprises encoded reference views, encoded reference disparity information, and encoded synthesized residuals. The method further randomly accesses and selects a group of reference views and corresponding disparity information from the encoded light field data based on one or more selected regions of interest. And the method transmits the selected group of reference views, the selected (Continued)

corresponding disparity information, and the encoded synthesized residuals.

22 Claims, 9 Drawing Sheets

(51) Int. Cl.
*H04N 19/17* (2014.01)
*H04N 19/105* (2014.01)

(56) References Cited

U.S. PATENT DOCUMENTS

| | | | |
|---|---|---|---|
| 6,097,394 A | 8/2000 | Levoy et al. | |
| 6,738,533 B1 | 5/2004 | Shum et al. | |
| 6,963,431 B2 | 11/2005 | Holzbach et al. | |
| 7,623,560 B2 | 11/2009 | El-Ghoroury et al. | |
| 7,767,479 B2 | 8/2010 | El-Ghoroury et al. | |
| 7,829,902 B2 | 11/2010 | El-Ghoroury et al. | |
| 7,856,149 B2 | 12/2010 | Govindaswamy et al. | |
| 7,978,407 B1 | 7/2011 | Connor | |
| 8,049,231 B2 | 11/2011 | El-Ghoroury et al. | |
| 8,243,770 B2 | 8/2012 | El-Ghoroury et al. | |
| 8,284,237 B2 | 10/2012 | Chen et al. | |
| 8,401,316 B2 | 3/2013 | Babacan et al. | |
| 8,567,960 B2 | 10/2013 | El-Ghoroury et al. | |
| 8,681,185 B2 | 3/2014 | Guncer | |
| 8,854,724 B2 | 10/2014 | El-Ghoroury et al. | |
| 8,928,969 B2 | 1/2015 | Alpaslan et al. | |
| 8,970,646 B2 | 3/2015 | Guncer | |
| 9,179,126 B2 | 11/2015 | El-Ghoroury et al. | |
| 9,195,053 B2 | 11/2015 | El-Ghoroury et al. | |
| 9,414,087 B2 | 8/2016 | Akeley et al. | |
| 9,462,164 B2 | 10/2016 | Venkataraman et al. | |
| 9,681,069 B2 | 6/2017 | El-Ghoroury et al. | |
| 9,712,764 B2 | 7/2017 | El-Ghoroury et al. | |
| 9,774,800 B2 | 9/2017 | El-Ghoroury et al. | |
| 9,779,515 B2 | 10/2017 | El-Ghoroury et al. | |
| 2002/0067521 A1 | 6/2002 | Holzbach et al. | |
| 2008/0043095 A1 | 2/2008 | Vetro et al. | |
| 2008/0198920 A1 | 8/2008 | Yang et al. | |
| 2009/0086170 A1 | 4/2009 | El-Ghoroury et al. | |
| 2009/0278998 A1 | 11/2009 | El-Ghoroury et al. | |
| 2010/0003777 A1 | 1/2010 | El-Ghoroury et al. | |
| 2010/0007804 A1 | 1/2010 | Guncer | |
| 2010/0066921 A1 | 3/2010 | El-Ghoroury et al. | |
| 2010/0156894 A1 | 6/2010 | Holler et al. | |
| 2010/0220042 A1 | 9/2010 | El-Ghoroury et al. | |
| 2010/0225679 A1 | 9/2010 | Guncer | |
| 2010/0231585 A1 | 9/2010 | Weiblen | |
| 2010/0271511 A1* | 10/2010 | Ma | H04N 19/597 |
| | | | 348/239 |
| 2011/0058021 A1 | 3/2011 | Chen et al. | |
| 2011/0134227 A1 | 6/2011 | Shin | |
| 2012/0033113 A1 | 2/2012 | El-Ghoroury et al. | |
| 2012/0183232 A1 | 7/2012 | Babacan et al. | |
| 2012/0213270 A1 | 8/2012 | Baraniuk et al. | |
| 2012/0249750 A1 | 10/2012 | Izzat et al. | |
| 2012/0293635 A1 | 11/2012 | Sharma et al. | |
| 2013/0010057 A1 | 1/2013 | Borel et al. | |
| 2013/0077880 A1 | 3/2013 | Venkataraman et al. | |
| 2013/0077882 A1 | 3/2013 | Venkataraman et al. | |
| 2013/0082905 A1 | 4/2013 | Ranieri et al. | |
| 2013/0141895 A1 | 6/2013 | Alpaslan et al. | |
| 2013/0258451 A1 | 10/2013 | El-Ghoroury et al. | |
| 2013/0294504 A1 | 11/2013 | Mishourovsky et al. | |
| 2013/0321581 A1 | 12/2013 | El-Ghoroury et al. | |
| 2014/0085417 A1 | 3/2014 | Shi et al. | |
| 2014/0232822 A1 | 8/2014 | Venkataraman et al. | |
| 2014/0347361 A1 | 11/2014 | Alpaslan et al. | |
| 2015/0015669 A1 | 1/2015 | Venkataraman et al. | |
| 2015/0033539 A1 | 2/2015 | El-Ghoroury et al. | |
| 2015/0199794 A1 | 7/2015 | Venkataraman et al. | |
| 2015/0201176 A1 | 7/2015 | Graziosi et al. | |
| 2016/0021355 A1 | 1/2016 | Alpaslan et al. | |
| 2016/0028935 A1 | 1/2016 | El-Ghoroury et al. | |
| 2016/0100198 A1 | 4/2016 | Matsui et al. | |
| 2016/0142615 A1 | 5/2016 | Liang et al. | |
| 2016/0182782 A1 | 6/2016 | El-Ghoroury et al. | |
| 2016/0191765 A1 | 6/2016 | El-Ghoroury et al. | |
| 2016/0191823 A1 | 6/2016 | El-Ghoroury et al. | |
| 2016/0357147 A1 | 12/2016 | Falkenberg et al. | |
| 2016/0360177 A1 | 12/2016 | Graziosi et al. | |
| 2017/0070751 A1* | 3/2017 | Shimizu | H04N 19/172 |
| 2017/0142427 A1 | 5/2017 | Graziosi et al. | |
| 2017/0236295 A1 | 8/2017 | El-Ghoroury et al. | |
| 2017/0257649 A1 | 9/2017 | Bourouihiya | |
| 2018/0003522 A1 | 1/2018 | Ionescu et al. | |
| 2018/0097867 A1 | 4/2018 | Pang et al. | |
| 2018/0350038 A1 | 12/2018 | Cen et al. | |
| 2018/0352254 A1 | 12/2018 | Alpaslan et al. | |
| 2018/0359489 A1* | 12/2018 | Lakshman | H04N 19/597 |
| 2019/0068973 A1 | 2/2019 | Hamilton et al. | |
| 2019/0158877 A1* | 5/2019 | Thoreau | H04N 19/597 |
| 2019/0320186 A1 | 10/2019 | Liu et al. | |
| 2019/0394488 A1 | 12/2019 | Alpaslan et al. | |
| 2020/0036988 A1 | 1/2020 | Graziosi et al. | |

FOREIGN PATENT DOCUMENTS

| | | |
|---|---|---|
| WO | 2016172384 A1 | 10/2016 |
| WO | 2019199854 A1 | 10/2019 |
| WO | 2020006035 A1 | 1/2020 |

OTHER PUBLICATIONS

Candes, Emmanuel J. et al., "Robust Uncertainty Principles: Exact Signal Reconstruction From Highly Incomplete Frequency Information", IEEE Transactions on Information Theory, vol. 52, No. 2, Feb. 2006, pp. 489-509.

Donoho, David L. , "Compressed Sensing", IEEE Transactions on Information Theory, vol. 52, No. 4, Apr. 2006, pp. 1289-1306.

Graziosi, Danillo B. et al., "Depth assisted compression of full parallax light fields", Stereoscopic Displays and Applications XXVI, Proceedings of SPIE-IS&T Electronic Imaging, vol. 9391, Mar. 17, 2015, pp. 93910Y-1 to 93910Y-15.

Heide, Felix et al., "Adaptive Image Synthesis for Compressive Displays", Proc. of SIGGRAPH 2013 (ACM Transactions on Graphics), vol. 32, No. 4, 2013, 11 pp. total.

Hoffman, David M. et al., "Vergence-accommodation conflicts hinder visual performance and cause visual fatigue", Journal of Vision, vol. 8, No. 3, 2008, pp. 1-30.

International Organisation for, Standardisation , "Call for Proposals on 3D Video Coding Technology", ISO/IEC JTC1/SC29/WG11, MPEG2011/N12036, Geneva, Switzerland, Mar. 2011, 20 pp. total.

International Telecommunication, Union , "H.264, Series H: Audiovisual and MultiMedia Systems, Infrastructure of audiovisual services—Coding of moving video, Advanced video coding for generic audiovisual services", ISO/IEC 14496-10:2003, Coding of Audiovisual Objects—Part 10: Advanced Video Coding, ITU-T Recommendation H.264, Mar. 2005, 343 pp. total.

Levoy, Marc et al., "Light Field Rendering", Computer Graphics, SIGGRAPH 96 Proceedings, 1996, pp. 31-42.

Lucente, Mark , "Diffraction-Specific Fringe Computation for Electro-Holography", Doctoral Thesis Dissertation, MIT Dept. of Electrical Engineering and Computer Science, Sep. 1994, 171 pp. total.

Magnor, Marcus et al., "Data Compression for Light-Field Rendering", IEEE Transactions on Circuits and Systems for Video Technology, vol. 10, No. 3, Apr. 2000, pp. 338-343.

Vetro, Anthony et al., "Overview of the Stereo and Multiview Video Coding Extensions of the H.264/MPEG-4 AVC Standard", Proceedings of the IEEE, vol. 99, No. 4, Apr. 2011, pp. 626-642.

Wetzstein, Gordon et al., "Compressive Light Field Displays", IEEE Computer Graphics and Applications, vol. 32, Issue 5, Sep./Oct. 2012, pp. 6-11.

Zhang, Cha et al., "A survey on image-based rendering—representation, sampling and compression", Signal Processing: Image Communication, vol. 19, 2004, pp. 1-28.

(56) References Cited

OTHER PUBLICATIONS

Zhao, Yin et al., "Suppressing Texture-Depth Misalignment for Boundary Noise Removal in View Synthesis," 28th Picture Coding Symposium, PSC2010, Naoova, Japan (Dec. 8-10, 2010), pp. 30-33.
Alpaslan, Z.Y., et al., "Development and Deployment of a Tiled Full Parallax Light Field Display System," Proceedings of the SPIE, Applications of Digital Image Processing XXXIX, vol. 9971 (Sep. 27, 2016), pp. 99710J-1 to 99710J-8.
Alpaslan, Z.Y., et al., "Parametric Characterization of Perceived Light Field Display Resolution," SID Symposium Digest of Technical Papers, vol. 47, No. 1 (May 2016), pp. 1241-1245.
Alpaslan, Z.Y., et al., "Small Form Factor Full Parallax Tiled Light Field Display,", Proceedings of Electronic Imaging, SPIE-IS&T, vol. 9391 (Feb. 9, 2015), pp. 93910E-1 to 93910E-10.
Candes, Emmanuel et al., "Near Optimal Signal Recovery From Random Projections: Universal Encoding Strategies?" 2004, pp. 1-39.
Chai, Jin-Xiang et al., "Plenoptic Sampling," Proceedings of the 27th Annual Conference on Computer Graphics and Interactive Techniques—SIGGRAPH '00, 2000, pp. 307-318.
Conti, Caroline et al., "Light-Field Video Coding Using Geometry-Based Disparity Compensation", 2014 3DTV-Conference: The True Vision—Capture, Transmission and Display of 3D Video (3DTV-CON), IEEE, Jul. 2, 2014, pp. 1-4.
Dricot, A. et al., "Integral Images Compression Scheme Based on View Extraction", 2015 23rd European Signal Processing Conference (EUSIPCO), Aug. 31, 2015, pp. 101-105.
El-Ghoroury, H.S. et al., "Quantum Photonic Imager (QPI): A New Display Technology and Its Applications," Proceedings of The International Display Workshops, vol. 21 (Dec. 3, 2014), pp. 1202-1205.
Fehn, Christoph , "Depth-Image-Based Rendering (DIBR), Compression and Transmission for a New Approach on 3D-TV," Proc. of SPIE Stereoscopic Displays and Virtual Reality Systems XI (2004), pp. 93-104.
Fehn, Christoph, "A 3D-TV Approach Using Depth-Image-Based Rendering (DIBR)," Proceedings of Picture Coding Symposium, San Francisco, CA, USA Dec. 2004, 6 pages.
Furihata, H., et al, "Novel view synthesis with residual error feedback for FTV," Stereoscopic Displays and Applications XXI, Proceedings of the SPIE-IS&T Electronic Imaging, vol. 7542, Jan. 2010, pp. 75240K-1 to 75240K-12.
Gilliam, C., et al, "Adaptive Plenoptic Sampling," 2011 18th IEEE International Conference on Image Processing, 2011, pp. 2581-2584.
Gortler, Steven J., et al., "The Lumigraph," Proceedings of the 23rd Annual Conference on Computer Graphics and Interactive Techniques (SIGGRAPH '96), 1996, pp. 43-52.
Graziosi, Danillo B., et al., "Compression for Full-Parallax Light Field Displays," Stereoscopic Displays and Applications XXV, Proceedings of SPIE-IS&T Electronic Imaging, vol. 9011, Mar. 6, 2014, pp. 90111A-1 to 90111A-14.
International Organisation for, Standardisation , "Use Cases and Requirements on Free-viewpoint Television (FTV)," ISO/IEC JTC1/SC29/WG11, MPEG2013/N14104, Geneva, Switzerland (Oct. 2013), 12 pages.
International Organisation for Standardization, "Call for Proposals on 3D Video Coding Technology," ISO/IEC JTC1/SC29/WG11, MPEG2011/N12036, Geneva, Switzerland, Mar. 2011, 20 pages.
International Preliminary Report on Patentability for International Patent Application No. PCT/US2019/026619, dated Oct. 13, 2020, 17 pages.
International Preliminary Report on Patentability for International Patent Application No. PCT/US2019/039165, dated Dec. 29, 2020, 6 pages.
International Search Report and Written Opinion for International Patent Application No. PCT/US2018/035730, dated Sep. 10, 2018, 17 pages.
International Search Report and Written Opinion for International Patent Application No. PCT/US2019/026619, dated Sep. 17, 2019, 24 pages.
International Search Report and Written Opinion for International Patent Application No. PCT/US2019/039165, dated Sep. 24, 2019, 8 pages.
International Search Report and Written Opinion of International Patent Application No. PCT/US2018/035713, dated Aug. 21, 2018, 17 pages.
Iwadate, Y. et al., "Generating Integral Image from 3D Object by Using Oblique Projection", 18th International Display Workshops 2011 (IDS '11) (Dec. 7-9, 2011), pp. 269-272.
Lee, Cheon et al., "View Synthesis using Depth Map for 3D Video," Proceedings of 2009 APSIPA Annual Summit and conference, Sapporo, Japan (2009), pp. 350-357.
Li, Li, et al., "Pseudo Sequence based 2-D hierarchical reference structure for Light-Field Image Compression," arxiv.org, Cornell University Library, 201 Olin Library Cornell University, Ithaca, NY, Dec. 21, 2016, 10 pages.
Li, Yun et al., "Scalable Coding of Plenoptic Images by Using a Sparse Set and Disparities", IEEE Transactions on Image Processing, vol. 25, No. 1, Jan. 2016, pp. 80-91.
Lim, Chongsoon, et al., "Reference Lists for B Pictures Under Low Delay Constraints", Joint Collaborative Team on Video Coding (JCT-VC) of ITU-T SG16 WP3 and ISO/IEC JTC1/SC29/WG11, 4th Meeting: Daegu, KR, Document: JCTVC-D093, Jan. 20-28, 2011, pp. 1-7.
Liu, Shujie, et al., "New Depth Coding Techniques With Utilization of Corresponding Video", IEEE Transactions on Broadcasting, vol. 57, No. 2, Jun. 2011, oo. 551-561.
Malvar, Henrique S. et al., "Lifting-based reversible color transformations for image compression", Proc. of SPIE of Applications of Digital Image Processing, vol. 7073, 2008, pp. 707301-1 to 707301-10.
Mori, Yuji et al., "View generation with 3D warping using depth information for FTV", Signal Processing: Image Communication, vol. 24 (2009), pp. 65-72.
Morvan, Yannick et al., "Platelet-based coding of depth maps for the transmission of multiview images", Proceedings of the SPIE, Stereoscopic Displays and Applications, vol. 6055 (Feb. 2006), 12 pages.
Non-Final Office Action for U.S. Appl. No. 15/994,328, dated Jan. 7, 2020, 13 pages.
Non-Final Office Action for U.S. Appl. No. 15/994,870, dated Apr. 22, 2020, 19 pages.
Non-Final Office Action for U.S. Appl. No. 16/378,228, dated Mar. 5, 2020, 10 pages.
Notice of Allowance for Taiwan Patent Application No. 108112656, dated Dec. 21, 2020, 3 pages.
Notice of Allowance for U.S. Appl. No. 15/994,870, dated Nov. 13, 2020, 8 pages.
Notice of Allowance for U.S. Appl. No. 16/378,228, dated Oct. 16, 2020, 6 pages.
Office Action for Taiwan Patent Application No. 108112656, mailed Mar. 13, 2020, 10 pages.
Oh, Kwan-Jung, et al., "Depth Reconstruction Filter and Down/Up Sampling for Depth Coding in 3-D Video", IEEE Signal Processing Letters, vol. 16, No. 9, Sep. 2009, pp. 747-750.
Oh, Kwan-Jung, et al., "Hole-Filling Method Using Depth Based In-Painting for View Synthesis in Free Viewpoint Television (FTV) and 3D Video", Picture Coding Symposium (PCS) 2009, May 6-8, 2009, 4 pages.
Panasonic Corporation, "Reference Lists for B Pictures Under Low Delay", Document: JCTVC-D093, Joint Collaborative Team on Video Coding (JCT-VC) of ITU-T SG16 WP3 and ISO/IEC JTC1/SC29/WG11 4th Meeting, Jan. 20-28, 2011.
Piao, Yan et al., "Sub-sampling Elemental Images for Integral Imaging Compression", International Conference on Audio Language and Image Processing (ICALIP), 2010, pp. 1164-1168.
Sjostrom, Marten et al., "Improved Depth-Image-Based Rendering Algorithm," 3DTV Conference: The True Vision—Capture, Transmission and Display of 3D Video (3DTV-CON) (2011), 4 pages.

(56) References Cited

OTHER PUBLICATIONS

Solh, Mashhour et al., "Depth Adaptive Hierarchical Hole-Filling for DIBR-Based 3D Videos," Proceedings of the SPIE, Three-Dimensional Image Processing (3DIP) and Applications II, vol. 8290 (2012), pp. 829004-1 to 829004-11.

Takahashi, Keita, "Theoretical Analysis of View Interpolation With Inaccurate Depth Information," IEEE Transactions on Image Processing, vol. 21, No. 2 (Feb. 2012), pp. 718-732.

Wang, Zhou et al., "Image Quality Assessment: From Error Visibility to Structural Similarity," IEEE Transactions on Image Processing, vol. 13, No. 4 (Apr. 2004), pp. 600-612.

Wegner, Krzysztof et al., "Enhanced View Synthesis Reference Software (VSRS) for Free-viewpoint Television", International Organisation for Standardisation, ISO/IEC JTC1/SC29/WG11, MPEG2013/M31520, Geneva, Switzerland, Oct. 2013, 4 pages.

Williams, J. et al., "An Extended Kalman Filtering Approach to High Precision Stereo Image Matching", Proceedings of the 1998 International Conference on Image Processing (ICIP), vol. 2, Oct. 4-7, 1998, pp. 157-16.

Yan, P. et al., "Integral image compression based on optical characteristic", IET Computer Vision, vol. 5, No. 3, 2011, pp. 164-168.

Yang, Lu et al., "Artifact reduction using reliability reasoning for image generation of FTV", Journal of Visual Communication and Image Representation, vol. 21, 2010, pp. 542-560.

Non-Final Office Action for U.S. Appl. No. 17/182,115, dated Apr. 9, 2021, 27 pages.

\* cited by examiner

RANDOM ACCESS IN ENCODED FULL PARALLAX LIGHT FIELD IMAGES

CROSS REFERENCE TO RELATED APPLICATIONS

This application claims the benefit of U.S. Provisional Application No. 62/690,001 filed on Jun. 26, 2018, the disclosure of which is incorporated by reference herein.

FIELD OF THE INVENTION

Embodiments of the invention relate to image and video compression. More specifically, embodiments of the invention relate to random access in encoded full parallax light field images.

BACKGROUND

Depth perception in the human visual system (HVS) relies on several depth cues. These cues can be categorized as either psychological (e.g., perspective, shading, lighting, relative size, occlusion and texture gradient, etc.) or physiological depth cues (e.g., vergence, accommodation, motion parallax, binocular disparity, etc.). While psychological depth cues provide a relative understanding of the depth in a light field, physiological depth cues provide absolute depth information. Commercially available three-dimensional (3D) displays often use a subset of the physiological depth cues to enhance the light field viewing experience.

Glasses-based 3D displays have been gaining popularity since the introduction of glasses-based 3D televisions (TVs) sold by all major TV manufacturers. A shortcoming of the currently available technology is paradoxically the actual use of 3D glasses, which glasses can be categorized as either active or passive. In general, glasses-based technology is known to be uncomfortable for viewers to use for long time periods and poses challenges for people who require prescription glasses.

Existing autostereoscopic displays use directional modulators (such as parallax barriers or lenticular sheets) attached to a display surface to create a 3D effect without requiring glasses. Commercially available autostereoscopic displays typically use horizontal parallax to present 3D information to the viewer. Deficiencies of this form of display technology include a limited viewing angle and a limited resolution per view, each of which results in a lower quality 3D image. In addition, within the viewing angle of such displays, the user is required to keep his or her head vertical. Otherwise, the 3D effect would disappear.

Long viewing times in both glasses-based 3D displays and in horizontal parallax-only light field displays typically cause discomfort due to a physiological effect known as "vergence accommodation conflict" (VAC). See, e.g., Hoffman, D., Girshick, A., Akeley, K. & Banks, M. (2008), "Vergence-accommodation conflicts hinder visual performance and cause visual fatigue", Journal of Vision 8 (3), 33. VAC is caused by the fact the viewer's eyes are focused on the display surface plane but also need to converge away from it in order to perceive objects that are depicted at different depths, and thus viewer discomfort occurs.

A more natural 3D effect is achieved using full parallax 3D display technology. In addition to horizontal parallax, full parallax 3D display technology includes vertical parallax such that a vertical movement of the viewer provides a different view of the 3D scene. Full parallax displays generally have an order of magnitude or more views than horizontal parallax-only displays. Arranging these views densely creates a very natural 3D image that does not change when a user moves or tilts his or her head, and also eliminates VAC by providing correct accommodation and vergence cues. 3D displays that eliminate the VAC may be referred to as "VAC-free" 3D displays.

The main challenge associated with the aforementioned full parallax 3D displays is that the increase in modulated image resolution required to render full parallax 3D images with wide viewing angles creates a new impairment for the display system, namely, a dramatically increased amount of image data. The generation, acquisition, transmission and modulation (or display) of very large image data sets required for a VAC-free full parallax light field display requires a data rate in the tens of terabits per second (Tbps).

A brief inspection of light field input images shows the ample inherent correlation between the light field data elements (known as holographic elements or "hogels") and compression algorithms that have been proposed to deal with this type of data in the prior art. See, e.g., M. Lucente, "Diffraction-Specific Fringe Computation for Electro-Holography", Doctoral Thesis Dissertation, MIT Depart. of Electrical Engineering and Computer Science, September 1994. However, as can be appreciated by those skilled in the art, only a limited number of the compression methods described in the prior art can practically be implemented in real-time and none of these methods can render and/or compress the amount of data required to drive a full parallax VAC-free display in real-time.

For example, currently, the most advanced video compression format, H.264/AVC, can compress ultra-high resolution video frames (4,096×2,304 @ 56.3, or 0.5 Gpixels/sec.) at a data bit rate of approximately 3 Gbits/sec. See, e.g., ISO/IEC 14496-10:2003, "Coding of Audiovisual Objects—Part 10: Advanced Video Coding," 2003, also ITU-T Recommendation H.264 "Advanced video coding for generic audiovisual services". H264/AVC fails to achieve sufficient compression needed for the useable transmission of light field image data, much less if the light field is refreshed in real time at a 60 Hz video rate where data rates can reach up to 86 Tbps.

Current compression standards do not exploit the high correlation that exists both in horizontal and vertical directions in a full parallax light field image. New compression standards targeting 3D displays are being developed. Nevertheless, they are targeting horizontal parallax only, a limited number of views, and usually require an increased amount of memory and related computational resources. Compression algorithms must balance image quality, compression ratio and computational load. As a general rule, a higher compression ratio in an encoder increases the computational load, making real-time implementation difficult. If both high compression and decreased computational load is required, then image quality is sacrificed. A compression solution that is able to simultaneously provide high image quality, a high compression ratio and relatively low computational load is highly desired.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
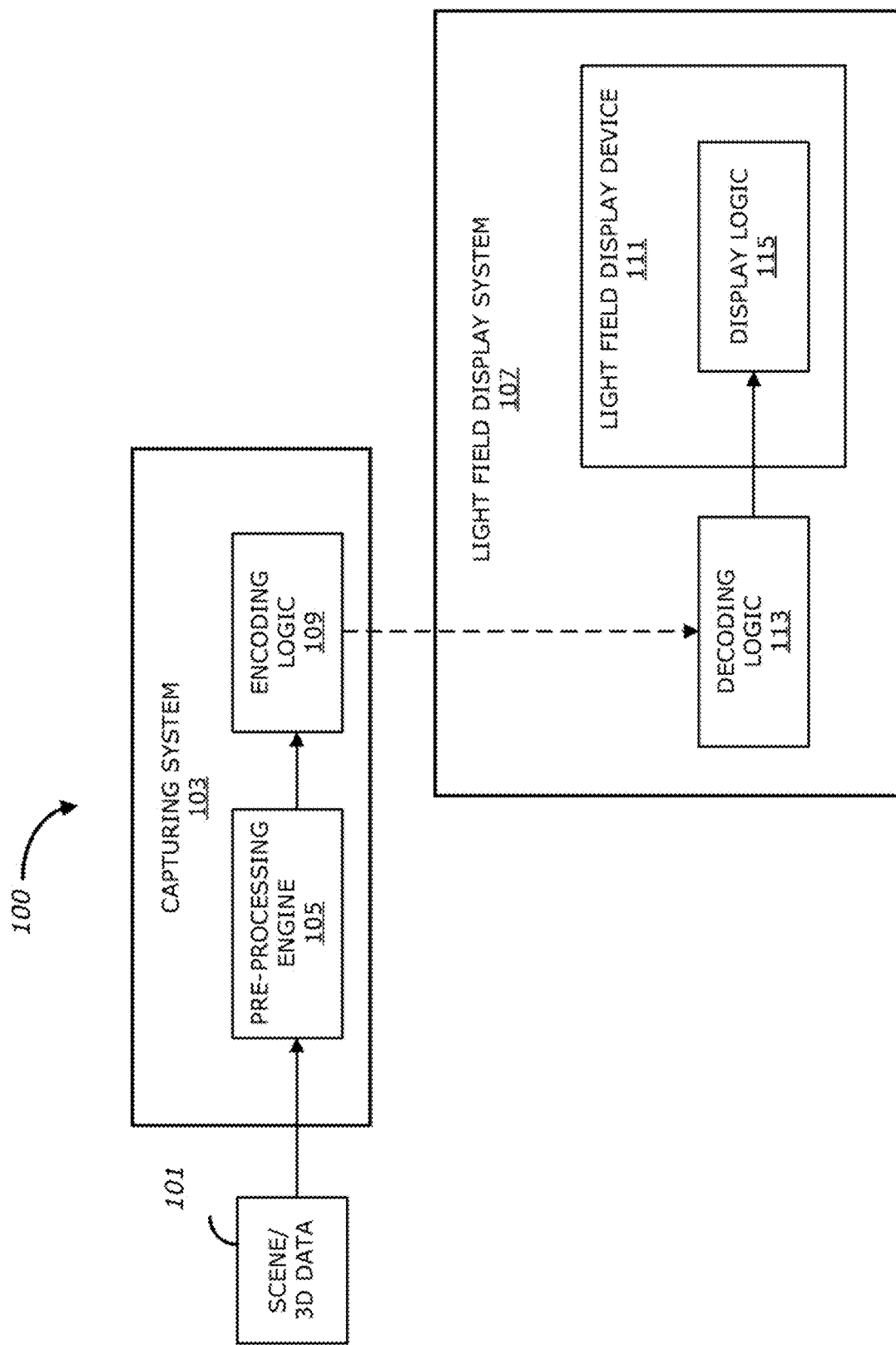
FIG. 1 illustrates a light field imaging system according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment", "an embodiment" or "some embodiments" means that a particular feature, structure, or characteristic described in conjunction with the embodiment can be included in at least one embodiment of the invention. The appearances of the phrase "in one embodiment" in various places in the specification do not necessarily all refer to the same embodiment.

Aspects of the invention herein introduce light field compression methods that overcome the drawbacks of the prior art, thereby making it feasible to create VAC-free full parallax 3D displays that utilize the compression methods of this invention for compressed light field imaging systems to reduce the required data rate, the processing requirements in both encoding and decoding and also power consumption for the entire imaging system. Additional advantages of the invention will become apparent from the following detailed description of various embodiments thereof that proceeds with reference to the accompanying drawings.

As is known, the transmission of large data sets can be facilitated with the use of a compressed data format. In conventional light field systems, the entire light field is first captured, and then it is compressed (or encoded) using either conventional image/video compression algorithms or light-field specific encoders. The compressed data can then be transmitted, stored and/or reconditioned for the light field display, where it is decompressed (or decoded) and modulated (examples of prior art light field compression systems are disclosed in, for instance, U.S. Pat. No. 8,401,316 B2, and U.S. Publication No. US2013/0077880).

Light fields can be compressed using a multi-view compression (MVC) standard. See, e.g., A. Vetro, T. Wiegand, G. Sullivan, "Overview of the stereo and multiview video coding extensions of the H.264/MPEG-4 AVC standard", Proceedings of the IEEE, vol. 99, no. 4, April 2011. Using the MVC standard, the hogels are interpreted as frames of a multi-view sequence and the disparity between images is estimated and encoded. The block-based disparity estimation generates inaccuracies that are encoded by a block-based encoder, and the compression performance grows linearly with the number of images.

To improve multi-view coding, new coding standards are considering the adoption of techniques from the field of computer vision. See, e.g., ISO/IEC JTC1/SC29/WG11, Call for Proposals on 3D Video Coding Technology, Geneva, Switzerland, March 2011. With the use of per-pixel depth information, reference images can be projected to new views and the synthesized images can be used instead of the costly transmission of new images. This technique requires increased computational resources and local memory on the decoder side, posing a challenge for its real-time implementation. Prior art compression tools are also targeting their use in horizontal-only multiview sequences and do not exploit the geometric arrangement of integral images.

Methods developed exclusively for light field image compression include a vector quantization method described by Levoy et al., "Light Field Rendering", Computer Graphics, SIGGRAPH 96 Proceedings, pp. 31-42, 1996, and video compression-based methods described by Magnor et al., "Data Compression for Light-Field Rendering", IEEE Transaction on Circuits and Systems for Video Technology, v. 10, n. 3, April 2000, pp. 338-343. The use of vector quantization is limited and cannot achieve high compression performances such as those presented by Magnor et al., which methods are similar to a multiview compression algorithm where the geometrical regularity of the images is exploited for disparity estimation. However, these methods require an increased amount of local memory and are not well-suited for real-time implementation.

Along with the problem of image data compression, there is a related issue of image data acquisition. The generation of the entire light field for encoding requires large amounts of processing throughput and memory, and many samples may be discarded at the compression stage. A recently developed technique referred to as "Compressed Sensing" (CS) attempts to address this problem. The underlying principal behind Compressive Sensing is that a signal that is highly compressible (or equivalently sparse) in some transform domains can be minimally sampled using an incoherent basis and still be reconstructed with acceptable quality. See, e.g., Candès, E., Romberg, J., Tao, T., "Robust uncertainty principles: Exact signal reconstruction from highly incomplete frequency information", IEEE Trans. Inform. Theory 52 (2006) 489-509. See also, e.g., David Donoho, "Compressed sensing," IEEE Transactions on Information Theory, Volume 52, Issue 4, April 2006, Pages: 1289-1306.

This new paradigm shifts the complexity from the acquisition to the reconstruction process, which results in the need for more complex decoders. This tendency is aligned with the trend of computational displays which present computational capability directly in the display devices. Displays that have computational capacity and are able to deal directly with compressed image data are known to those skilled in the art of image processing and light field technology as "compressive displays". See, e.g., Gordon Wetzstein, G., Lanman, D., Hirsch, M., Heidrich, W., and Raskar, R., "Compressive Light Field Displays", IEEE Computer Graphics and Applications, Volume 32, Issue 5, Pages: 6-11, 2012; Heide, F., Wetzstein, G., Raskar, R. and Heidrich, W., "Adaptive Image Synthesis for Compressive Displays", Proc. of SIGGRAPH 2013 (ACM Transactions on Graphics 32, 4), 2013. See also, e.g., S. Guncer, U.S. Publication No. US2010/0007804, Image Construction Method Based Video Display System, Jan. 14, 2010; S. Guncer, U.S. Patent Publication No. US2010/0225679, Multi-Pixel Addressing Method for Video Display System, Sep. 9, 2010.

In Graziosi et al., "Depth assisted compression of full parallax light fields", IS&T/SPIE Electronic Imaging. International Society for Optics and Photonics (Mar. 17, 2015), a synthesis method that targets light fields and uses both horizontal and vertical information was introduced. The above method adopts aspects of a method called Multiple Reference Depth-Image Based Rendering (MR-DIBR) and utilizes multiple references with associated disparities to render the light field. In this approach, disparities are first forward warped to a target position. Next, a filtering method is applied to the warped disparities to mitigate artifacts such as cracks caused by inaccurate pixel displacement. The third step is the merging of all of the filtered warped disparities. Pixels with smaller depths (i.e., those closest to the viewer) are selected. Finally, the merged elemental image disparity is used to backward warp the color from the references' colors and to generate the final synthesized elemental image.

Prior art light field compression methods using depth image-based rendering (DIBR), while efficient for compression of elemental images, are unable to incorporate occlusion and hole-filling functions necessary to provide high quality light field images at acceptable compression ratios. An example of such a prior art DIBR compression method is disclosed in, for instance, U.S. Publication No. 2016/0360177 entitled, "Methods for Full Parallax Compressed Light Field Synthesis Utilizing Depth Information", the entire contents of which are incorporated herein by reference.

As detailed in U.S. Publication No. 2016/0021355, "Preprocessor for Full Parallax Light Field Compression", the disclosure of which are incorporated herein by reference, MR-DIBR enables the reconstruction of other perspectives from reference images and from reference disparity maps. Reference images and reference disparity maps are initially selected via a "visibility test" in one embodiment. The visibility test makes use of: 1) the distance of the objects from the modulation surface, and 2) the display's field of view ("FOV"), to determine and define the reference images and disparity maps used by the method.

In general, a scene that contains objects that are farther from the modulation surface tends to result in a smaller number of reference images and reference disparity maps as compared to a scene that contains objects that are closer to the modulation surface. Smaller numbers of reference images and reference disparity maps result in a higher compression ratio. In general, however, higher compression ratios also mean greater degradation in the decoded image.

Accordingly, the prior art fails to adequately address the need for high compression ratio, high quality, low computational load light field data compression as is required for practical implementation of VAC-free full parallax, and wide viewing angle 3D display technologies.

Aspects of the invention improve upon a method of light field encoding or compression, for example, by using random access with MR-DIBR. The general concept is to further compress the output (i.e., reference information) of the MR-DIBR method (e.g., reference views and reference disparity maps) as well as the residuals of synthesized views (collectively as encoded light field data) using image/video compression methods, such as JPEG 2000. Based on a particular region of interest (RoI), the random access approach would enable selection of reference views and corresponding disparity maps associated with the RoI from the encoded light field data (along with the residuals) to decode or decompress.

According to one aspect, the method of light field image encoding is described. The method receives scene metadata and input light field images associated with a scene. The method further performs a first encoding operation on the scene metadata and the input light field images to generate reference views and reference disparity information. The method further performs a second encoding operation based on the reference views, the reference disparity information, and synthesized residuals to output encoded light field data, where the encoded light field data comprises encoded reference views, encoded reference disparity information, and encoded synthesized residuals. The method further randomly accesses and selects a group of reference views and corresponding disparity information from the encoded light field data based on one or more selected regions of interest. And the method transmits the selected group of reference views, the selected corresponding disparity information, and the encoded synthesized residuals.

According to another aspect, a method of light field image decoding is described. The method receives a selected group of reference views, selected corresponding disparity information, and encoded synthesized residuals associated with one or more regions of interest. The method further performs a first decoding operation on the selected group of reference views, the selected corresponding disparity information, and the encoded synthesized residuals to output decoded reference views, decoded disparity information, and decoded synthesized residuals. The method further performs a second decoded operation on the decoded reference views and the decoded disparity information to generate synthesized views. And the method generates decoded light field data based on the synthesized views and the decoded synthesized residuals.

FIG. 1 illustrates a light field imaging system according to one embodiment. Referring to FIG. 1, light field imaging system 100 may include a capturing system 103 and a light field display system 107 that may be communicatively coupled to each other, for example, over a network (not shown), such as the Internet or cloud service. Capturing system 103 may include a capturing device (not shown) such as a light-field camera, action camera, animation camera, camcorder, camera phone, compact camera, digital camera, high-speed camera, mirrorless camera, or pinhole camera. In one embodiment, capturing system 103 includes, but is not limited to, pre-processing engine 105 (also referred to as pre-processing logic, pre-processing module, or pre-processing unit, which may be implemented in software, hardware, or a combination thereof) and compression logic 109 (also referred to as compression engine, compression module, or compression unit, which may be implemented in software, hardware, or a combination thereof).

Pre-processing engine 105 may capture, acquire, receive, create, format, store and/or provide light field input data (or scene/3D data) 101, which may represent an object or a scene, to be utilized at different stages of a compression operation (as discussed in more detail herein below). To do so, pre-processing engine 105 may generate a priori (or pre-processing) information associated with light field input data 101, for example object locations in the scene, bounding boxes, camera sensor information, target display information and/or motion vector information. Moreover, in some embodiments, pre-processing engine 105 may perform stereo matching and/or depth estimation on the light field input data 101 to obtain a representation of the spatial structure of a scene, for example one or more depth maps (or disparity maps) and/or subimages (or subaperture images) associated with the object or scene.

In one embodiment, pre-processing engine 105 may convert the light field input data 101 from data space to display space of light field display device 111. Conversion of the light field input data 101 from data space to display space may be needed for the light field display device 111 to show light field information in compliance with light field display characteristics and the user (viewer) preferences. When the light field input data 101 is based on camera input, for example, the light field capture space (or coordinates) and the camera space (or coordinates) are typically not the same, and as such, the pre-processing engine 105 may need to convert the data from any camera's (capture) data space to the display space. This is particularly the case when multiple cameras are used to capture the light field and only a portion of the captured light field in included in the viewer preference space. This data space to display space conversion is done by the pre-processing engine 105 by analyzing the characteristics of the light field display device 111 and, in some embodiments, the user (viewer) preferences. Characteristics of the light field display device 111 may include, but are not limited to, image processing capabilities, refresh rate, number of hogels and anglets, color gamut, and brightness. Viewer preferences may include, but are not limited to, object viewing preferences, interaction preferences, and display preferences.

In one embodiment, pre-processing engine 105 may take the display characteristics and the user preferences into account and convert the light field input data 101 from data space to display space. For example, if the light field input data 101 includes mesh objects, then pre-processing engine 105 may analyze the display characteristics (such as number of hogels, number of anglets, and FOV), analyze the user preferences (such as object placement and viewing preferences), calculate bounding boxes, motion vectors, etc., and report such information to the light field display system 107. In one embodiment, data space to display space conversion may include data format conversion and motion analysis in addition to coordinate transformation. In one embodiment, data space to display space conversion may involve taking into account the position of the light modulation surface (display surface) of the light field display device 111, and the object's position relative to the display surface.

Encoding (or compression) logic 109 may receive the a priori (or pre-processing) information from pre-processing engine 105 for compression. For example, encoding logic 109 may execute one or more compression methods at different stages using the a priori information in order to generate compressed information (e.g., reference and/or residual information). In one embodiment, the compression methods may be based on image-based rendering (IBR), depth image-based rendering (DIBR), and/or multiple-reference depth image-based rendering (MR-DIBR). In one embodiment, the compression methods may, additionally or alternatively, be based on one or more image compression standards such as Joint Photographic Experts Group (JPEG), JPEG 2000, JPEG XS, or video compression standards (also referred to as video compression methods, video compression algorithms, or video compression codecs), such as Moving Picture Experts Group (MPEG), H.264, High Efficiency Video Coding (HEVC), Theora, RealVideo, RV40, VP9, AV1, Audio Video Interleaved (AVI), Flash Video (FLV), RealMedia, Ogg, QuickTime, and/or Matroska.

Encoding logic 109 may then communicate the encoded or compressed information, for example over a network (not shown), such as the Internet or cloud service, to decoding (or decompression) logic 113 to perform decompression operations. In one embodiment, the compressed information may be stored in a storage device (not shown) to be retrieved (or loaded) by decoding logic 113. The storage device, for example, may be a hard disk drive (HDD), solid state device (SSD), read only memory (ROM), random access memory (RAM), or optical storage media.

As further shown in FIG. 1, light field display system 107 may include, but is not limited to, decoding logic 113 (also referred to as decoding engine, decoding module, or decoding unit, which may be implemented in software, hardware, or a combination thereof) and light field display device 111 communicatively coupled to each other. The light field display device 111 may be any type of light field display device, such as a glasses-based 3D display device, autostereoscopic display device, VAC display device, or VAC-free full parallax 3D display device. As shown, light field display device 111 may include, but is not limited to, display logic 115 (also referred to as display engine, display module, or display unit, which may be implemented in software, hardware, or a combination thereof).

In one embodiment, decoding logic 113 may execute one or more decoding or decompression methods on the encoded information, which may be retrieved from the storage device, in order to generate decoded information (e.g., reference and/or residual information). Additionally or alternatively, decoding logic 113 may further decode some of the decoded information (e.g., reference information) to produce synthesized images (e.g., elemental images or hogel images). Using the synthesized images and part of the decoded information (e.g., residual information), decoding logic 113 may reconstruct the original object or scene represented by light field input data 101. The reconstructed images of the object or scene may be transmitted to display logic 115 to display, modulate or render on light field display device 111. As with the compression methods previously discussed, in one embodiment, the decoded operations may be based on IBR, DIBR, and/or MR-DIBR. In one embodiment, the decoded operations may, additionally or alternatively, be based on one or more image compression standards such as JPEG, JPEG 2000, JPEG XS, or one or more video compression standards, such as MPEG, H.264, HEVC, Theora, RealVideo, RV40, VP9, AV1, AVI, FLV, RealMedia, Ogg, QuickTime, and/or Matroska.

It should be appreciated that while FIG. 1 shows the light field capturing system 103 as being separate from the light field display system 107, in some embodiments the light field capturing system 103 may be part of the light field display system 107. It should also be appreciated that while FIG. 1 shows the pre-processing engine 105 as part of the light field capturing device 103, in some embodiments the pre-processing engine 105 may be part of the light field display system 107 or another system, logic, engine, module or unit. It should further be appreciated that while FIG. 1 shows the encoding logic 109 as part of the capturing system 103, in some embodiments, encoding logic 109 may be part of the light field display system 107 or another system, logic, engine, module or unit.

Figure 2:
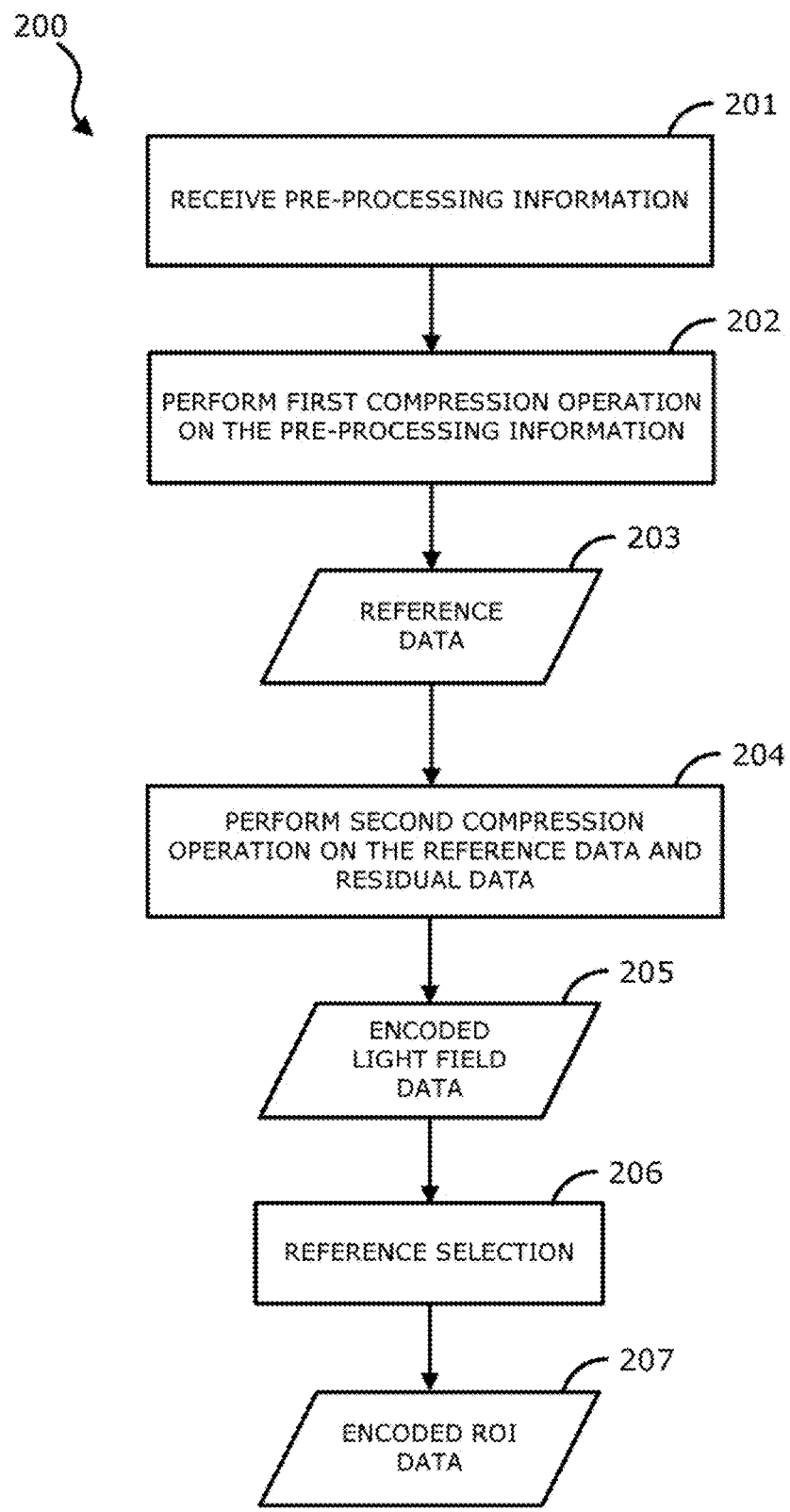
FIG. 2 is a flow diagram illustrating a method of light field encoding according to one embodiment.

FIG. 2 is a flow diagram illustrating a method of light field compression according to one embodiment of the invention. Process 200 may be performed by processing logic that includes hardware (e.g. circuitry, dedicated logic, etc.), software (e.g., embodied on a non-transitory computer readable medium), or a combination thereof. For example, process 200 may be performed by encoding logic 109 of FIG. 1.

Referring to FIG. 2, at block 201, the processing logic receives pre-processing information associated with light field input data 101. As previously described, pre-processing information may include object locations in the scene, bounding boxes, camera sensor information, target display information and/or motion vector information. In some embodiments, pre-processing information may include a representation of the spatial structure of a scene, for example one or more depth maps (or disparity maps) and/or subimages (or subaperture images) associated with the object or scene.

At block 202, the processing logic performs a first compression operation on the pre-processing information. For example, using depth maps and/or subimages (or subaperture images) from the pre-processing information, one or more light field compression methods (e.g., IBR, DIBR, or MR-DIBR) may be performed to generate reference data 203. The reference data 203 may include reference views (e.g., elemental images or hogel images) and corresponding reference disparity maps.

Because there remain significant similarities among the reference elemental images in DIBR, for example, further compression is possible to improve bandwidth efficiencies. The same logic also applies to the disparity map operation. The elemental images and disparity maps from different spatial/angle locations can be rearranged in successive sequences and treated as temporal frames to be encoded by a video codec.

One of the biggest issues of any DIBR algorithm, however, is the generation of holes and cracks due to inaccuracy in depth values, round-off errors and object disocclusion. MR-DIBR reduces the holes significantly due to using multiple references; however, synthesized images can still be different from the original images. The differences between the original and estimated values of synthesized elemental images are defined as residual images, which can also be encoded by a video codec. By encoding the reference elemental images, disparity maps, and residual images with a video codec, the overall distortion can range from lossy to lossless with corresponding bit rate tradeoffs in fine-grained steps.

Accordingly, at block 204, the processing logic performs a second compression operation on the reference data and residual data, for example residuals of synthesized views, such as synthesized elemental or hogel images. As previously described, one or more image compression standards such as JPEG, JPEG 2000, JPEG XS, or one or more video compression standards, such as MPEG, H.264, HEVC, Theora, RealVideo, RV40, VP9, AV1, AVI, FLV, RealMedia, Ogg, QuickTime, and/or Matroska, may be executed to compress (or encode) the reference data and residual data, thereby outputting encoded or compressed light field data 205, which includes compressed reference and residual data.

At block 206, one or more encoded reference views and corresponding disparity maps may be selected from encoded light field data 205 (as discussed in more detailed herein below) based on an RoI. The RoI may be requested by a user. The selected encoded reference views and corresponding reference disparity maps along with the encoded residual data may be generated or outputted as encoded RoI data 207.

Figure 3:
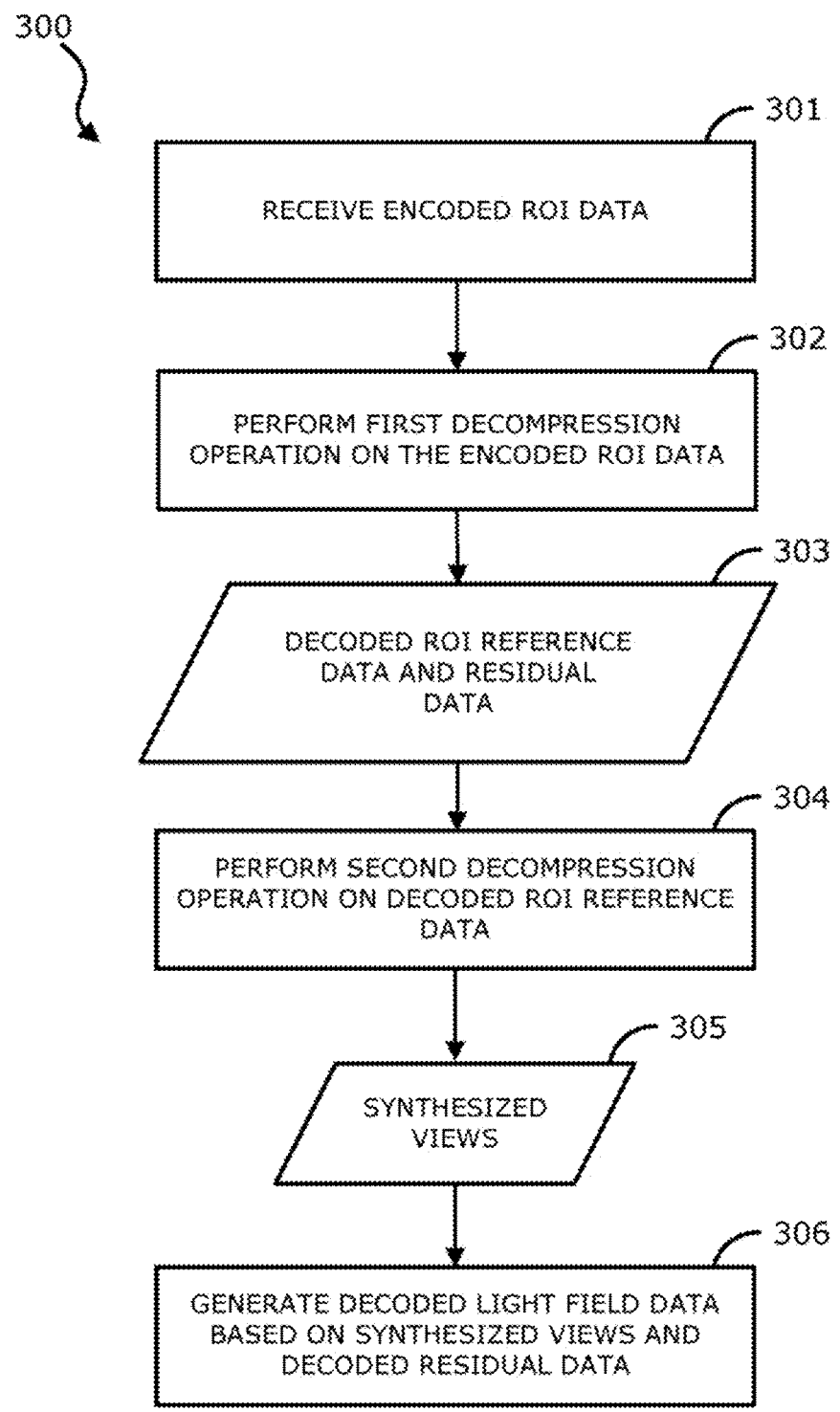
FIG. 3 is a flow diagram illustrating a method of light field decoding according to one embodiment.

FIG. 3 is a flow diagram illustrating a method of light field decoding according to one embodiment. Process 300 may be performed by processing logic that includes hardware (e.g. circuitry, dedicated logic, etc.), software (e.g., embodied on a non-transitory computer readable medium), or a combination thereof. For example, process 300 may be performed by decoding logic 113 of FIG. 1.

Referring to FIG. 3, at block 301, the processing logic receives encoded RoI data. At block 302, the processing logic performs a first decompression operation on the encoded RoI data. For example, one or more image decompression standards such as JPEG, JPEG 2000, JPEG XS, or one or more video decompression (or decoding) standards, such as MPEG, H.264, HEVC, Theora, RealVideo, RV40, VP9, AV1, AVI, FLV, RealMedia, Ogg, QuickTime, and/or Matroska, may be executed to decompress (or decode) the encoded RoI data and output decoded reference data associated with the RoI, for example decoded reference views and corresponding reference disparity maps associated with the RoI, and residual data, for example residuals of synthesized views (as shown at block 303). At block 304, the processing logic performs a second decompression operation on the decoded reference data. In one embodiment, one or more light field decompression (or decoding) methods, such as IBR, DIBR or MR-DIBR, may be executed to produce or generate synthesized views (as shown at block 305). At block 306, the processing logic generates decoded light field data based on the synthesized views and decoded residual data. As an example, in one embodiment the residual data may be added to the synthesized views to produce the decoded light field data, which may be modulated (or displayed) on a light field display device (e.g., light field display device 111 of FIG. 1).

Figure 4:
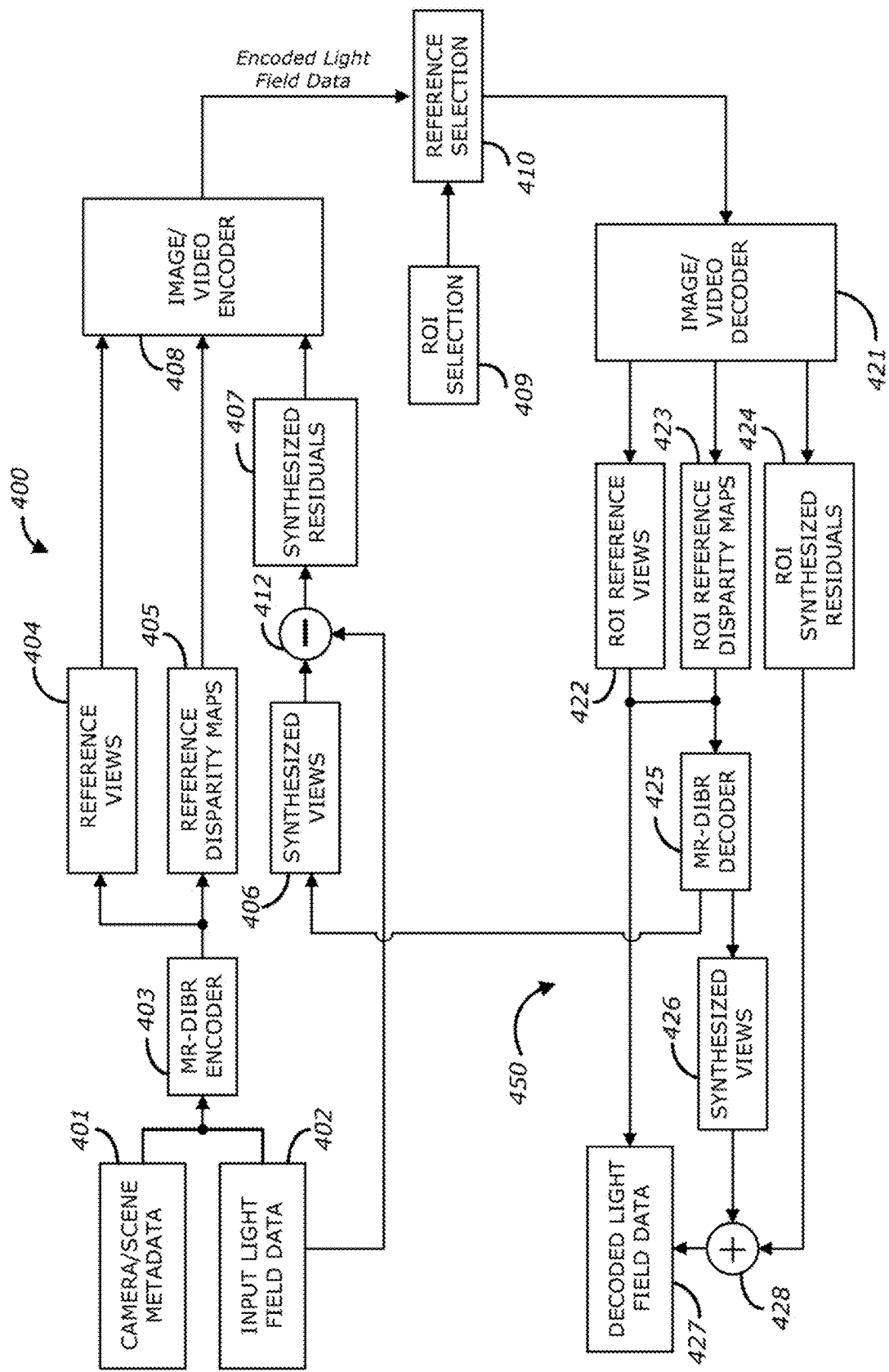
FIG. 4 is a block diagram illustrating an example of light field encoding and decoding architecture according to one embodiment.

FIG. 4 is a block diagram illustrating an example of light field encoding and decoding architecture according to one embodiment. In some embodiments, the architecture may be implemented as part of light field display system 107 of FIG. 1 (e.g., in encoding logic 109 and/or decoding logic 113 of FIG. 1).

As shown in FIG. 4, the architecture (or codec) includes an encoding stage 400 and a decoding stage 450. Encoding stage 400 includes MR-DIBR encoder 403 and image/video encoder 408. MR-DIBR encoder 403 may receive and compress camera (or scene) metadata 401 and input light field data 402 in order to generate reference views 404 (which may be elemental images (EIs) or hogels) and corresponding reference disparity maps 405. In one embodiment, metadata 401 may include optical characteristics of a capturing device and the captured data, such as camera pixel count, camera location(s), lens FOV, scene composition, its distance from the camera(s), and/or display device characteristics.

Reference views 404, reference disparity maps 405, and synthesized residuals 407 (discussed in more detail herein below) may be provided to image/video encoder 408 (e.g., JPEG, JPEG 2000, or JPEG XS encoder, or MPEG, H.264, HEVC, Theora, RealVideo, RV40, VP9, AV1, AVI, FLV, RealMedia, Ogg, QuickTime, or Matroska encoder) for further compression. For example, image/video encoder 408 may compress (or encode) the reference views 404, reference disparity maps 405 and synthesized residuals 407 at a bit rate in order to generate encoded light field data (e.g., compressed reference views, reference disparity maps, and synthesized residuals). In one embodiment, image/video encoder 408 may include multiple encoders (e.g., JPEG 2000 encoders) to encode the reference views 404, reference disparity maps 405 and synthesized residuals 407.

As further shown in FIG. 4, the encoded light field data is communicated to a reference selection 410. Reference selection 410 provides random access capability that can be measured by the following formula:

| Resources used in random access of an *RoI* with the *Codec* |
|---|
| Resources used in full decoding of the data with the same *Codec* |

Generally, the definition of an RoI in a 2D image is usually as simple as an image region. However, due to the volumetric nature of light field images, and various use cases, the definition of an RoI is more complicated for a light field image.

In some embodiments, the use cases for light field images can be examined in two different ways:

First is display based which is considered the visualization of and interaction with the light field image. The display determines the size of the RoI and number of views to be decoded. For example, direct view light field display (e.g., television, PC monitor) can display a subset of the light field (subset of the views, subset of the total field of view (FOV), etc.). Six depth of field (DoF) interaction may be possible with light field image, and a full suite of rendering operations is not required, though remapping may be needed. Another example is near eye display (e.g., glasses) which requires fewer views than the direct view light field display (e.g., 1+ views/eye). In this case, six DoF interaction may also be possible with the light field image, but additional rendering operations may be needed as compared to direct view light field display. Yet another example is 2D display which usually displays only one view. In this case, three DoF interaction with the data is possible, but a full suite of rendering operations may be needed.

Second is rendering based (e.g., a location to focus in an image) which considers various algorithmic methods (e.g., depth of field change, refocus, relighting, motion parallax, navigation, enhanced analysis and manipulation, reference JPEG Pleno CfP) to make use of the light field image. Depth of field change is the change in the depth of field after capture in a flexible way. Refocus is the change of focus as well as the ability to refocus on object(s) of interest after capture. Relighting is the change of lighting, including both number of sources and the direction of lighting in an already captured or synthesized scene. Motion parallax is the change of viewing perspective from observer's position. Navigation is the ability to view a scene from different positions and directions with the ability to explore the scene by moving inside the scene. Enhanced analysis and manipulation is the facilitation of advanced analysis and manipulation of objects within a scene, such as their segmentation, modification, and even removal or replacement by taking into account richer information extracted from plenoptic data such as depth (either directly or indirectly).

Figure 5:
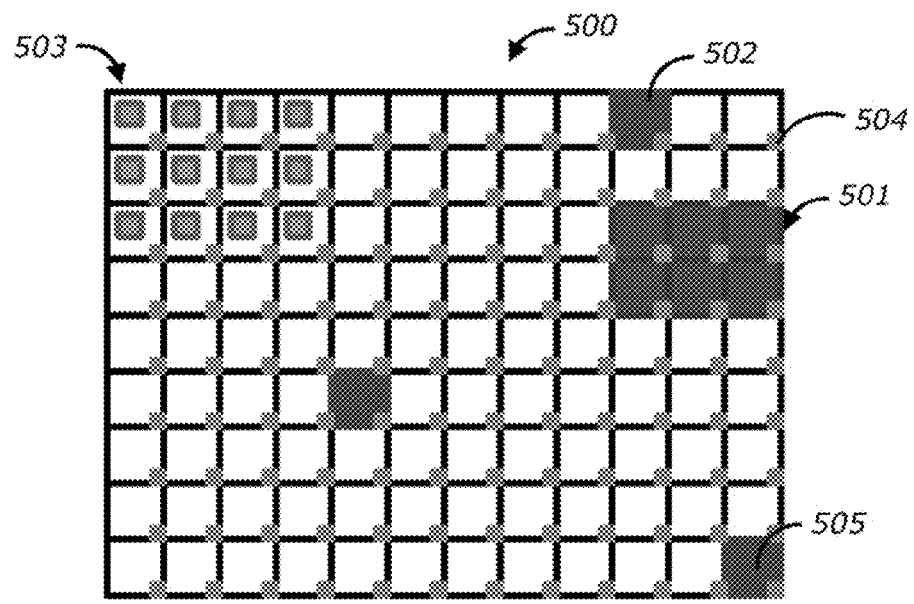
FIG. 5 is a block diagram illustrating different components in encoded light field data.

To accomplish the foregoing use cases, referring now to FIG. 5, reference selection 410 may access different components in encoded light field data 500, such as: view 502, multiple neighboring views 501, multiple non-neighboring views (e.g., views 502 and 505), a specific pixel from all the views (e.g., pixel 504), a specific group of pixels from a specific group of views (e.g., group of pixels 503), or all the views (i.e., full decoding).

Figure 6:
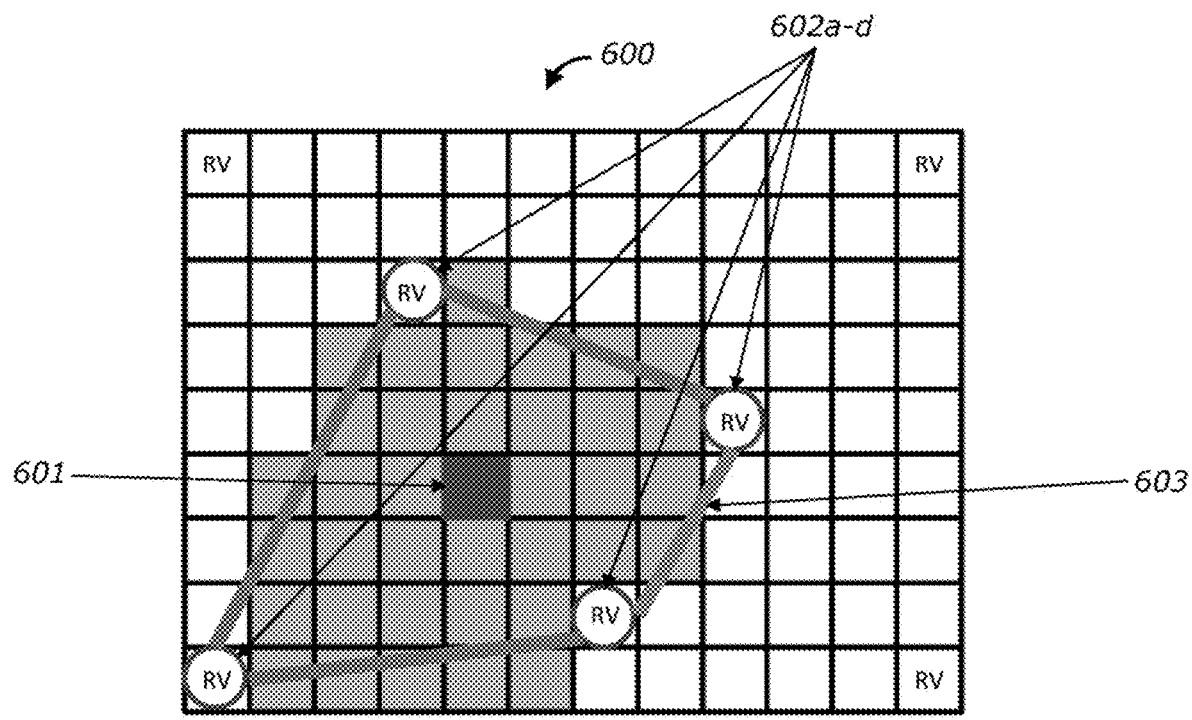
FIG. 6 is a block diagram illustrating an exemplary technique for selecting reference views associated with a region of interest (RoI) according to one embodiment.

Referring now to FIG. 6, which is a block diagram illustrating an exemplary technique for selecting reference views associated with a region of interest (RoI) according to one embodiment, MR-DIBR requires encoding of selected reference views (RVs) and their corresponding disparity maps using, for example, JPEG 2000. Random access with MR-DIBR has two components: (1) random access to a group of RVs and disparity maps required for RoI access, closest in view distance to the desired RoI, with JPEG 2000, and (2) synthesis of the RoI with the MR-DIBR method.

For example, as shown in FIG. 6, encoded light field data 600 may include a multiplicity of RVs. RoI 601 may be randomly selected by RoI selection 409 of FIG. 4. RoI selection 409 may select RoI 601 based on a request from a user. In one embodiment, RoI 601 may be a specific view or a whole region (as indicated in the shaded area of FIG. 6). Based on the location of RoI 601, reference selection 410 may determine that RVs 602*a-d* (and their corresponding disparity maps) have the closest in view distance to the desired RoI 601. Thus, RVs 602*a-d* are selected for RoI access of RoI 601. Moreover, additional views can be accessed for free (as indicated by path 603), that is no additional resources are required, with RVs 602*a-d*.

Figure 7:
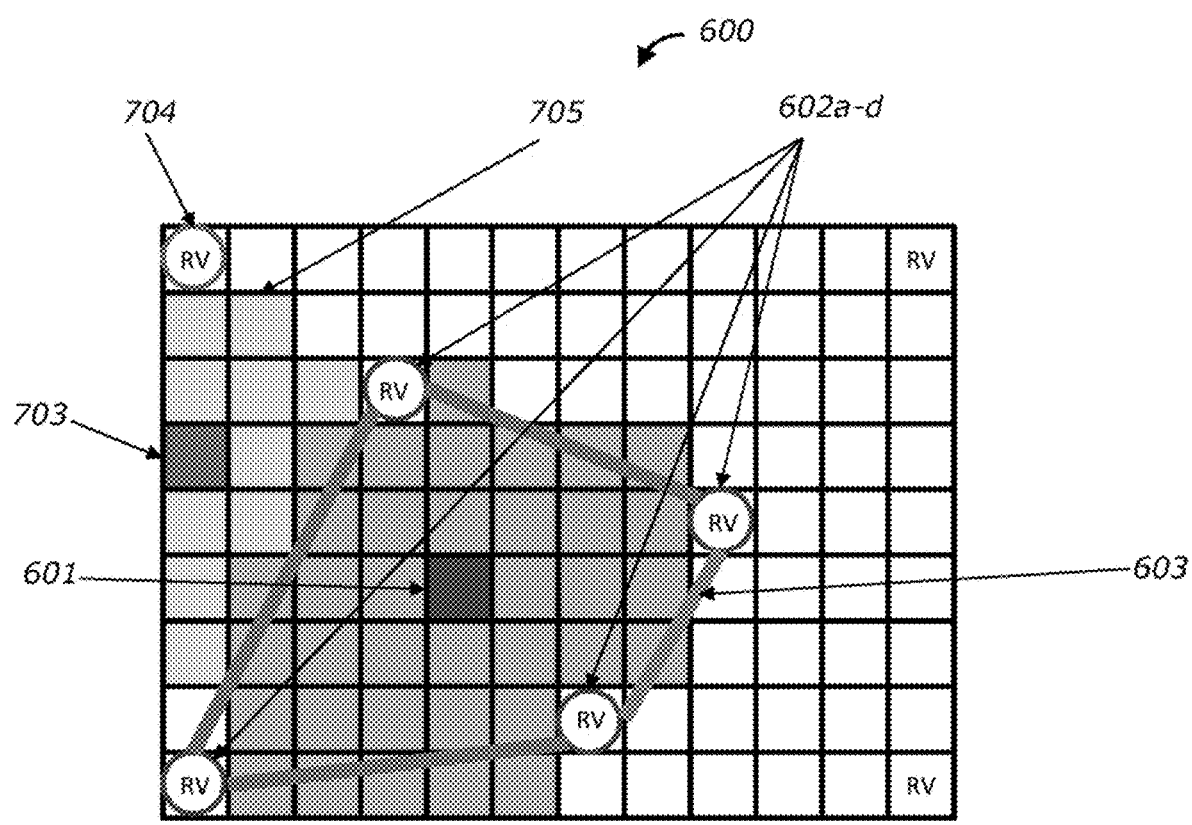
FIG. 7 is a block diagram illustrating an exemplary technique for selecting reference views associated with multiple ROIs according to one embodiment.

Turning now to FIG. 7, an additional RoI 703 may be selected by RoI selection 409. In this scenario, non-adjacent RoI view access requires adding more RVs (e.g., RV 704). However, the number of RVs required for additional RoI 703 is generally smaller than the number of RVs required for the initial RoI 601 access as shown in FIG. 7. Also, additional RV 705 can be accessed for free (i.e., no additional resources required) with new RV 704.

Accessing a single pixel or group of pixels from all the views requires decoding of all the RVs. However synthesis of the RoI does not require the synthesis of the whole intermediate view (IV). Instead both backward warping and forward warping operations can be simplified greatly due to smaller number of pixels needed for warping.

Figure 8:
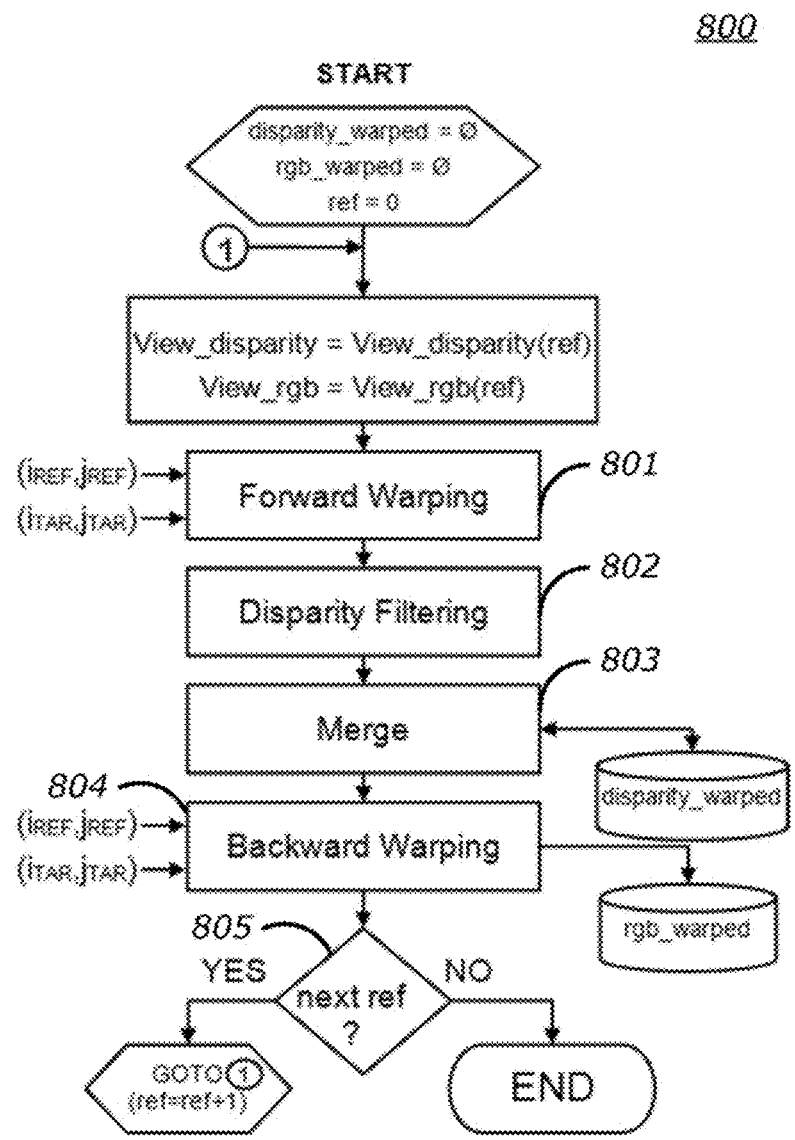
FIG. 8 is a flow diagram of an MR-DIBR operation according to one embodiment.

FIG. 8 is a flow diagram of an MR-DIBR operation according to one embodiment. At block 801, forward warping is performed for each of the reference disparities or disparity maps associated with an RoI (e.g., RoI 601 or RoI 703). At block 802, disparity filtering is applied (e.g., crack filter) in each of the forward warped reference disparity. At block 803, the forward warped and filtered disparity maps are merged into a reference disparity (e.g., synthesized depth). At block 804, backward warping is performed using the merged reference disparity and reference views to produce synthesized views (or texture).

In some embodiments, the MR-DIBR operation is performed by processing logic which may include software, hardware, or a combination thereof. In one embodiment, the use of multiple references increases the chance that the disoccluded texture after warping will be present in one of the reference disparities, and therefore hole filling is minimized or completely avoided. This provides a better quality than synthetic hole-filling algorithms. However, it requires a careful selection of the reference elemental images while increasing MR-DIBR processing time and memory usage.

In forward warping 801, the reference disparities may be shifted according to the distance between the target image and the reference image, and their respective disparity values. In order to reduce the memory usage of multiple references, only the disparity is used for forward warping. Due to round-off and quantization errors, cracks may appear in the forward warped disparity. Hence, disparity filtering 802 may be used to detect the erroneous disparity values and correct them with neighboring disparities. The warped and filtered disparities are then merged together (at block 803), and since multiple references are used, there is a probability that the disoccluded view will be present in one of the references. Finally, in backward warping 804 the merged disparity is used to indicate the location in the reference images to obtain the final texture.

Figure 9:
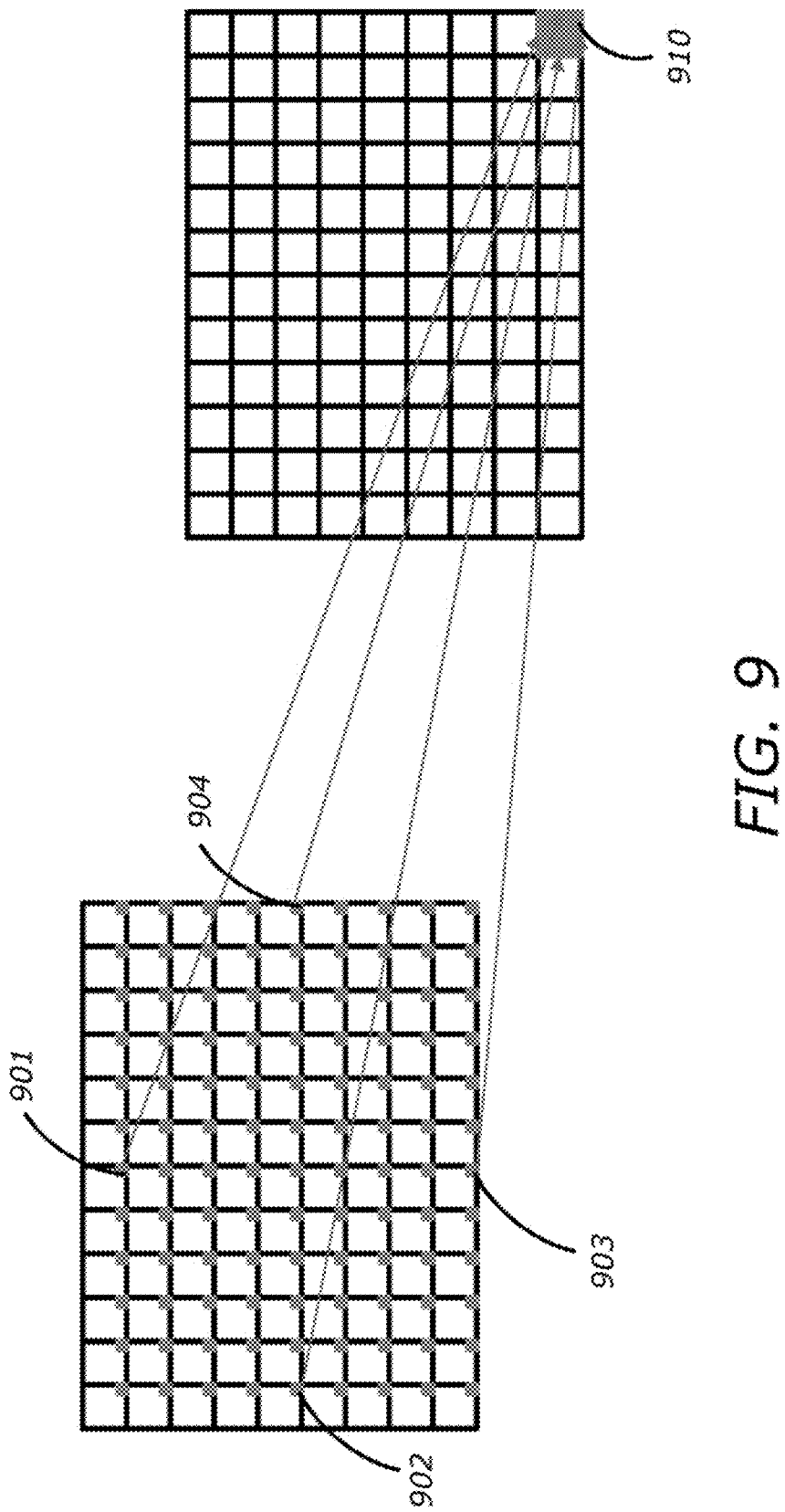
FIG. 9 is a block diagram illustrating a representation of perspective reference views and orthographic reference views.

With reference to FIG. 9, accessing a single pixel or group of pixels (e.g., pixels 901-904) from all the views can be handled by decoding a single view (e.g., view 910) if both angular and spatial reference views are encoded. In light field images, there is generally a one to one mapping between angular representation and spatial representation. A view in one representation belongs to multiple views as a single pixel in another representation.

These representations are usually perspective pictures and orthographic pictures. Therefore if one encodes perspective reference views as well as orthographic reference views. Then both spatial and angular representations can be accessed by just decoding a single view. The methods for encoding and decoding perspective and orthographic views is disclosed in U.S. patent application Ser. No. 15/993,268, entitled "Methods and Systems for Light Field Compression Using Multiple Reference Depth Image-Based Rendering", the disclosure of which is incorporated herein by reference. In the case of both light field 1.0 and light field 2.0 the same arguments are valid.

With reference back to FIG. 4, decoding stage 450 operates in reverse order and includes image/video decoder 421 and MR-DIBR decoder 425. As shown, image/video decoder 421 (e.g., JPEG, JPEG 2000, or JPEG XS decoder, or MPEG, H.264, HEVC, Theora, RealVideo, RV40, VP9, AV1, AVI, FLV, RealMedia, Ogg, QuickTime, or Matroska decoder) receives and decodes the selected encoded reference views, reference disparity maps, and synthesized residuals provided by reference selection 410 to generate decoded reference views 422, decoded reference disparity maps 423, and decoded synthesized residuals 424 associated with one or more selected RoIs. For example, image/video decoder 421 may include multiple video decoders (e.g., JPEG 2000 decoders) to decode the selected encoded reference views, reference disparity maps, and synthesized residuals. Reference views 422 and reference disparity maps 423 are provided to MR-DIBR decoder 425 for further decompression. MR-DIBR decoder 425 decompresses reference views 422 and reference disparity maps 423 so as to generate synthesized views 426. Synthesized views 426 may be subtracted, by subtractor 412, from input light field data 402 to obtain synthesized residuals 407. Synthesized views 426 may be added, by adder 428, to synthesized residuals 424 to obtain decoded light field data 427, which may be modulated (or displayed) on a light field display device (e.g., light field display device 111 of FIG. 1).

Figure 10:
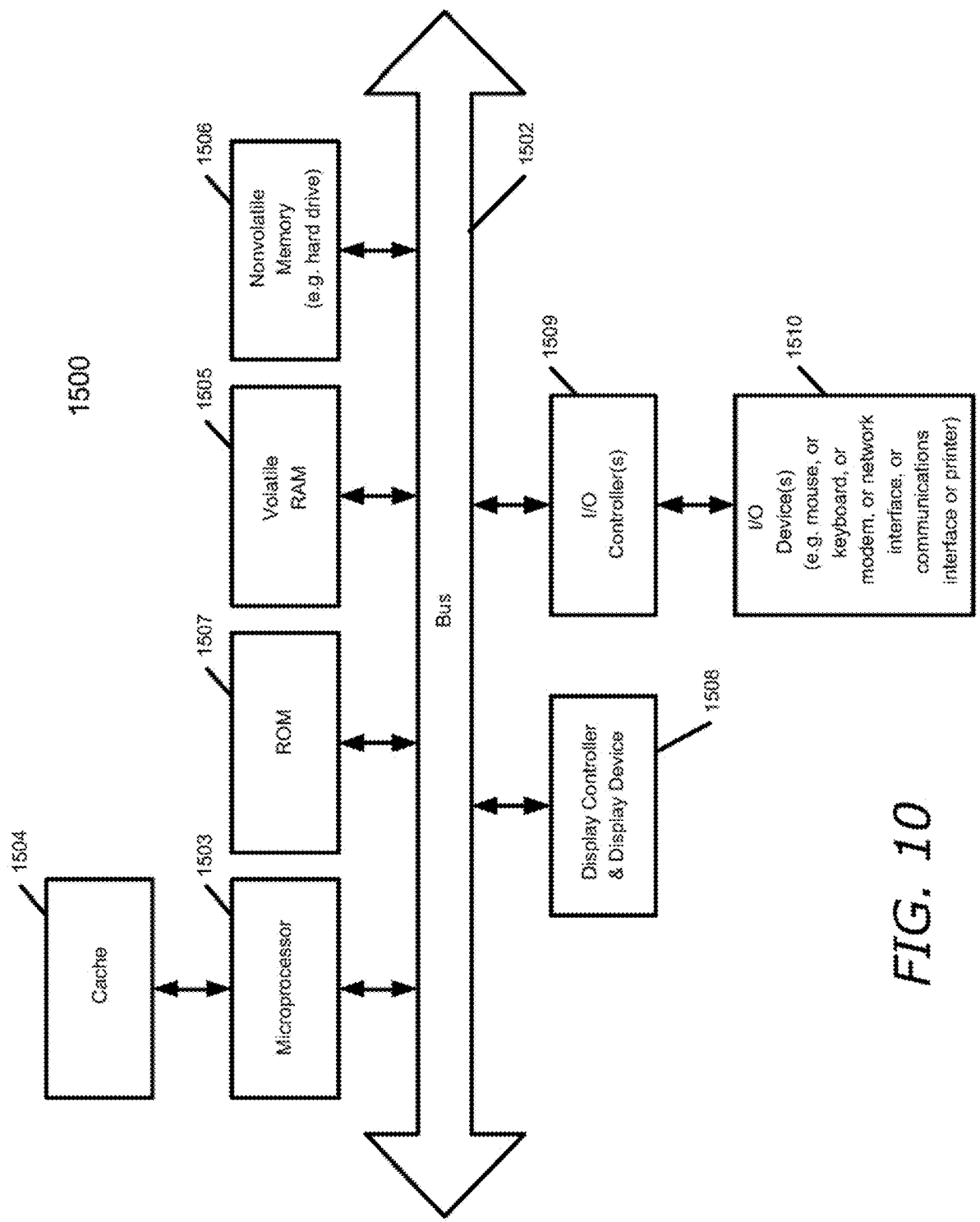
FIG. 10 is a block diagram of a data processing system, which may be used with one embodiment.

FIG. 10 is a block diagram of a data processing system, which may be used with one embodiment of the invention. For example, the system 1500 may be used as part of capturing system 103, light field display system 107 and/or light field display device 111 as shown in FIG. 1. Note that while FIG. 10 illustrates various components of a computer system, it is not intended to represent any particular architecture or manner of interconnecting the components, as such details are not germane to the invention. It will also be appreciated that network computers, handheld computers, mobile devices (e.g., smartphones, tablets) and other data processing systems which have fewer components or perhaps more components may also be used with the invention.

As shown in FIG. 10, the system 1500, which is a form of a data processing system, includes a bus or interconnect 1502 which is coupled to one or more microprocessors 1503 and a ROM 1507, a volatile RAM 1505, and a non-volatile memory 1506. The microprocessor 1503 is coupled to cache memory 1504. The bus 1502 interconnects these various components together and also interconnects these components 1503, 1507, 1505, and 1506 to a display controller and display device 1508, as well as to input/output (I/O) devices 1510, which may be mice, keyboards, modems, network interfaces, printers, and other devices which are well-known in the art.

Typically, the input/output devices 1510 are coupled to the system through input/output controllers 1509. The volatile RAM 1505 is typically implemented as dynamic RAM (DRAM) which requires power continuously in order to refresh or maintain the data in the memory. The non-volatile memory 1506 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, a non-volatile memory that is remote from the system may be utilized, such as, a network storage device which is coupled to the data processing system through a network interface such as a modem or Ethernet interface. The bus 1502 may include one or more buses connected to each other through various bridges, controllers, and/or adapters, as is well-known in the art. In one embodiment, the I/O controller 1509 includes a Universal Serial Bus (USB) adapter for controlling USB peripherals. Alternatively, I/O controller 1509 may include an IEEE-1394 adapter, also known as FireWire adapter, for controlling FireWire devices.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method of light field image encoding, comprising:
    receiving scene metadata and input light field images associated with a scene;
    performing a first encoding operation on the scene metadata and the input light field images to generate reference views and reference disparity information;
    performing a second encoding operation based on the reference views, the reference disparity information, and synthesized residuals to output encoded light field data, wherein the encoded light field data comprises encoded reference views, encoded reference disparity information, and encoded synthesized residuals;
    randomly accessing and selecting a group of reference views and corresponding disparity information from the encoded light field data based on one or more selected regions of interest; and transmitting the selected group of reference views, the selected corresponding disparity information, and the encoded synthesized residuals.

2. The method of claim 1, wherein randomly accessing and selecting the group of reference views and corresponding disparity information from the encoded light field data comprises:

determining and selecting a first subgroup of reference views required for accessing a first region of interest, wherein each reference view in the first subgroup has a closest in view distance to the first region of interest.

3. The method of claim 2, wherein randomly accessing and selecting the group of reference views and corresponding disparity information from the encoded light field data further comprises: accessing additional views using the first subgroup of reference views.

4. The method of claim 2, wherein randomly accessing and selecting the group of reference views and corresponding disparity information from the encoded light field data further comprises:

determining and selecting a second subgroup of reference views required for accessing a second region of interest, wherein each reference view in the second subgroup has a closest in view distance to the second region of interest.

5. The method of claim 4, wherein randomly accessing and selecting the group of reference views and corresponding disparity information from the encoded light field data further comprises: accessing additional views using the second subgroup of reference views.

6. The method of claim 4, wherein the second subgroup has fewer reference views than the first subgroup.

7. The method of claim 4, wherein the first and second regions of interest are adjacent or non-adjacent regions of interest.

8. The method of claim 1, wherein the one or more regions of interest are selected by a user.

9. The method of claim 1, wherein the one or more regions of interest comprise one view or a plurality of views.

10. The method of claim 1, wherein the first encoding operation is a multiple-reference depth image-based rendering (MR-DIBR) operation.

11. The method of claim 1, wherein the second encoding operation is a JPEG 2000 operation.

12. The method of claim 1, wherein the synthesized residuals are calculated by subtracting synthesized views from the input light field images.

13. The method of claim 1, wherein the input light field images are elemental images or hogel images.

14. A computer-implemented method of light field image decoding, comprising:

receiving a selected group of reference views, selected corresponding disparity information, and encoded synthesized residuals associated with one or more regions of interest;

performing a first decoding operation on the selected group of reference views, the selected corresponding disparity information, and the encoded synthesized residuals to output decoded reference views, decoded disparity information, and decoded synthesized residuals;

performing a second decoded operation on the decoded reference views and the decoded disparity information to generate synthesized views; and generating decoded light field data based on the synthesized views and the decoded synthesized residuals.

15. The method of claim 14, wherein performing the second decoded operation comprises:

forward warping each reference disparity from the decoded reference disparity information to produce a plurality of forward warped reference disparities, filtering each of the forward warped reference disparities to generate a plurality of filtered reference disparities, merging the plurality of filtered reference disparities into a merged disparity, and backward warping, using the merged disparity and the decoded reference views, to produce the synthesized views.

16. The method of claim 14, wherein the received selected group of reference views and selected corresponding disparity information are produced by random access and selection of a set of reference views and corresponding disparity information from encoded light field data, the encoded light field data comprising encoded reference views, encoded reference disparity information, and encoded synthesized residuals.

17. The method of claim 16, wherein the random access and selection of the set of reference views and corresponding disparity information includes a determination and selection of a first subset of reference views required for accessing a first region of interest, wherein each reference view in the first subset has a closest in view distance to the first region of interest.

18. The method of claim 17, wherein the random access and selection of the set of reference views and corresponding disparity information further includes a determination and selection of a second subset of reference views required for accessing a second region of interest, wherein each reference view in the second subset has a closest in view distance to the second region of interest.

19. The method of claim 17, wherein the random access and selection of the set of reference views and corresponding disparity information further includes an access of additional views using the first subset of reference views.

20. The method of claim 18, wherein the random access and selection of the set of reference views and corresponding disparity information further includes an access of additional views using the second subset of reference views.

21. The method of claim 14, wherein generating the decoded light field data comprises adding the decoded synthesized residuals to the synthesized views.

22. The method of claim 14, wherein the synthesized residuals are calculated based on input light field data and the synthesized views.

* * * * *